United States Patent [19]

Woodward

[11] Patent Number: 5,408,829
[45] Date of Patent: Apr. 25, 1995

[54] OUTBOARD MOTOR WITH MEANS FOR SUPPLYING SECONDARY TO CATALYTIC CONVERTER

[75] Inventor: Lee A. Woodward, Racine, Wis.

[73] Assignee: Outboard Marine Corporation, Waukegan, Ill.

[21] Appl. No.: 127,952

[22] Filed: Sep. 28, 1993

[51] Int. Cl.⁶ ............................................... F01N 3/20
[52] U.S. Cl. ....................................... 60/302; 60/304; 60/307; 123/559.1; 440/89
[58] Field of Search ................ 60/302, 304, 305, 307, 60/280; 123/559.1; 418/259, 268; 440/89

[56] References Cited

U.S. PATENT DOCUMENTS

| | | | |
|---|---|---|---|
| 2,022,900 | 12/1935 | Pavlecka | 123/559.1 |
| 2,956,865 | 10/1960 | Williams | 23/284 |
| 3,058,299 | 10/1962 | Dean | 60/30 |
| 3,059,419 | 10/1962 | Schnabel | 60/30 |
| 3,082,597 | 3/1963 | Hamblin | 60/30 |
| 3,091,078 | 5/1963 | Dworak | 60/30 |
| 3,116,596 | 1/1964 | Boehme et al. | 60/30 |
| 3,396,535 | 8/1968 | Milos | 60/30 |
| 3,517,504 | 6/1970 | Sakamoto | 60/307 |
| 3,672,172 | 6/1972 | Hammond | 60/282 |
| 3,771,921 | 11/1973 | Rohde et al. | 417/12 |
| 3,852,959 | 12/1974 | Weisgerberg | 60/290 |
| 3,862,540 | 1/1975 | Harvey | 60/290 |
| 4,098,078 | 7/1978 | Laurent | 60/274 |
| 4,276,745 | 7/1981 | Takada et al. | 60/276 |
| 4,735,046 | 4/1988 | Iwai | 60/295 |
| 4,772,236 | 9/1988 | Takahashi | 60/302 |

*Primary Examiner*—Ira S. Lazarus
*Assistant Examiner*—Daniel J. O'Connor
*Attorney, Agent, or Firm*—Michael, Best & Friedrich

[57] ABSTRACT

Disclosed herein is an outboard motor comprising a drive shaft housing including an inner wall partially defining a pumping chamber, an air inlet port communicating between the pumping chamber and the atmosphere, and an air outlet port communicating with the pumping chamber, a propeller shaft rotatably supported by the drive shaft housing, an engine mounted on the drive shaft housing, a drive shaft drivingly connecting the engine to the propeller shaft, a closure member which is supported by the drive shaft housing, which partially defines the pumping chamber, and which rotatably supports the drive shaft, an exhaust passageway communicating with the engine, a catalytic converter located in the exhaust passageway and communicating with the outlet port, and an impeller located in the pumping chamber, mounted on the drive shaft for rotation therewith, and operative to supply air to the catalytic converter.

12 Claims, 2 Drawing Sheets

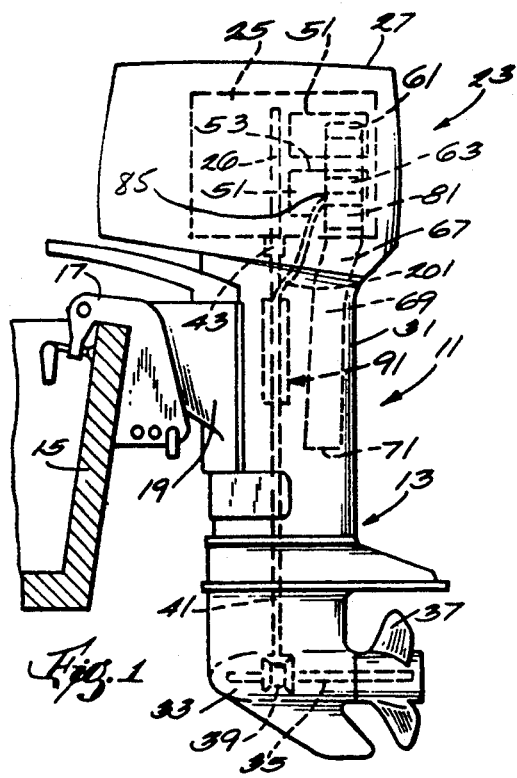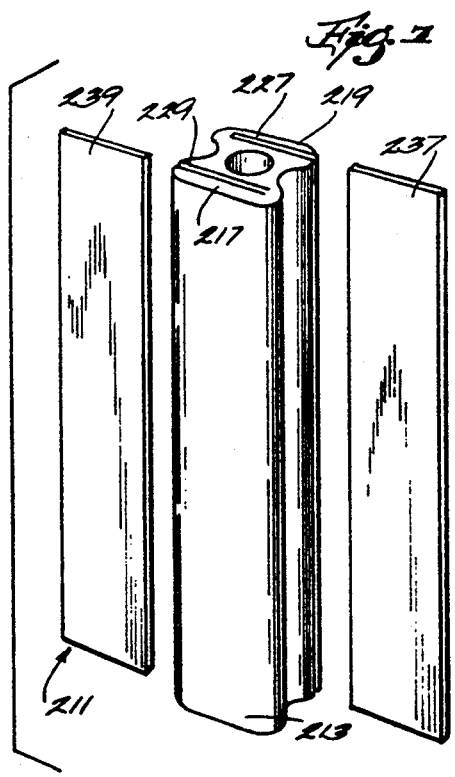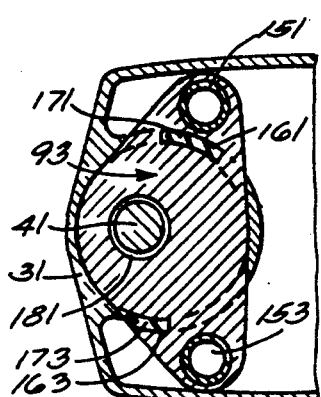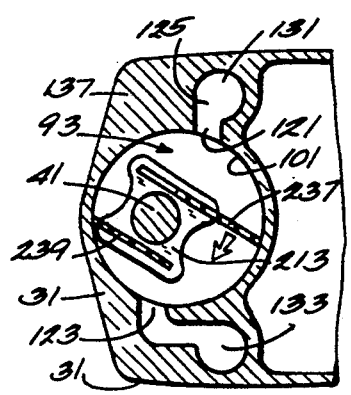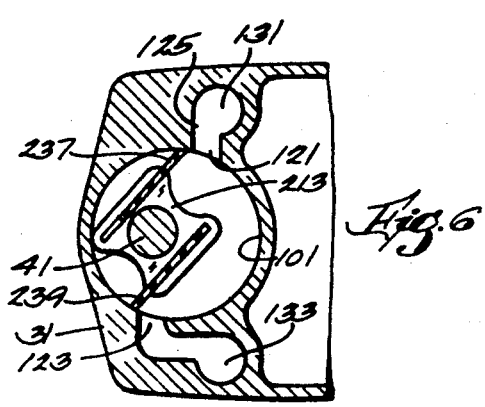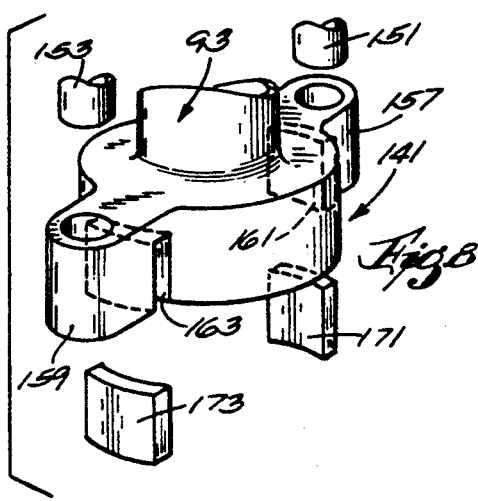

OUTBOARD MOTOR WITH MEANS FOR
SUPPLYING SECONDARY TO CATALYTIC
CONVERTER

BACKGROUND OF THE INVENTION

The invention relates generally to marine propulsion devices, such as outboard motors and stern drive units, which include internal combustion engines. More particularly the invention relates to outboard motors including catalytic converters for reducing pollution in the engine exhaust gas.

The invention also relates to arrangements for discharging exhaust gases so as to reduce pollutants therein. More particularly, the invention also relates to pollution eliminating arrangements which include provision for providing additional air to fully oxidize pollutants in the engine exhaust gases.

Attention is directed to the following U.S. patents:

| | | |
|---|---|---|
| 2,956,865 | D. P. Williams | October 18, 1960 |
| 3,058,299 | W. M. Dean | October 16, 1962 |
| 3,059,419 | J. W. Schnabel | October 23, 1962 |
| 3,082,597 | R. J. J. Hamblin | March 26, 1963 |
| 3,091,078 | T. A. Dworak | May 28, 1963 |
| 3,116,596 | Boehme, et al. | January 7, 1964 |
| 3,396,535 | L. W. Milos | August 13, 1968 |
| 3,672,172 | G. L. Hammond | June 27, 1972 |
| 3,771,921 | Rohde, et al. | November 13, 1973 |
| 3,852,959 | T. W. Weisgerber | December 10, 1974 |
| 3,862,540 | B. J. Harvey | January 28, 1975 |
| 4,098,078 | P. A. Laurent | July 4, 1978 |
| 4,276,745 | Takada, et al. | July 7, 1981 |
| 5,167,934 | Wolf, et al. | December 1, 1992 |

SUMMARY OF THE INVENTION

The invention provides a marine propulsion device comprising a drive shaft housing, a propeller shaft rotatably supported by the drive shaft housing, an engine mounted on the drive shaft housing, an air pump located in the drive shaft housing, and a drive shaft which is driven by the engine, which is drivingly connected to the propeller shaft, and which extends through the drive shaft housing and drives the air pump.

The invention also provides an outboard motor comprising a drive shaft housing including an inner wall partially defining a pumping chamber, an air inlet port communicating between the pumping chamber and the atmosphere, and an air outlet port communicating with the pumping chamber, a propeller shaft rotatably supported by the drive shaft housing, an engine mounted on the drive shaft housing, a drive shaft drivingly connecting the engine to the propeller shaft, an impeller located in the pumping chamber and mounted on the drive shaft for rotation therewith, and a closure member which is supported by the drive shaft housing, which partially defines the pumping chamber, and which rotatably supports the drive shaft.

The invention also provides an outboard motor comprising a drive shaft housing including an inner wall partially defining a pumping chamber, an air inlet port communicating between the pumping chamber and the atmosphere, and an air outlet port communicating with the pumping chamber, a propeller shaft rotatably supported by the drive shaft housing, an engine mounted on the drive shaft housing, a drive shaft drivingly connecting the engine to the propeller shaft, an exhaust passageway communicating with the engine, a catalytic converter located in the exhaust passageway and communicating with the outlet port, and an impeller located in the pumping chamber, mounted on the drive shaft for rotation therewith, and operative to supply air to the catalytic converter.

Other features of and advantages of the invention will become apparent to those skilled in the art upon review of the following detailed description, claims, and drawings.

THE DRAWINGS

FIG. 1 is a side elevational view of an outboard motor is a partially sectioned, partially schematic view of a stern drive unit including various of the features of the invention.

FIG. 4 is a fragmentary sectional view taken along line 4—4 of FIG. 2.

FIG. 5 is a fragmentary sectional view taken along line 5—5 of FIG. 2.

FIG. 6 is a view which is similar to FIG. 5 and which illustrates the components therein in a different position.

FIG. 7 is an exploded view of certain of the components included in the outboard motor shown in FIG. 1.

FIG. 8 is an exploded view of certain other of the components included in the outboard motor shown in FIG. 1.

Figure 3:
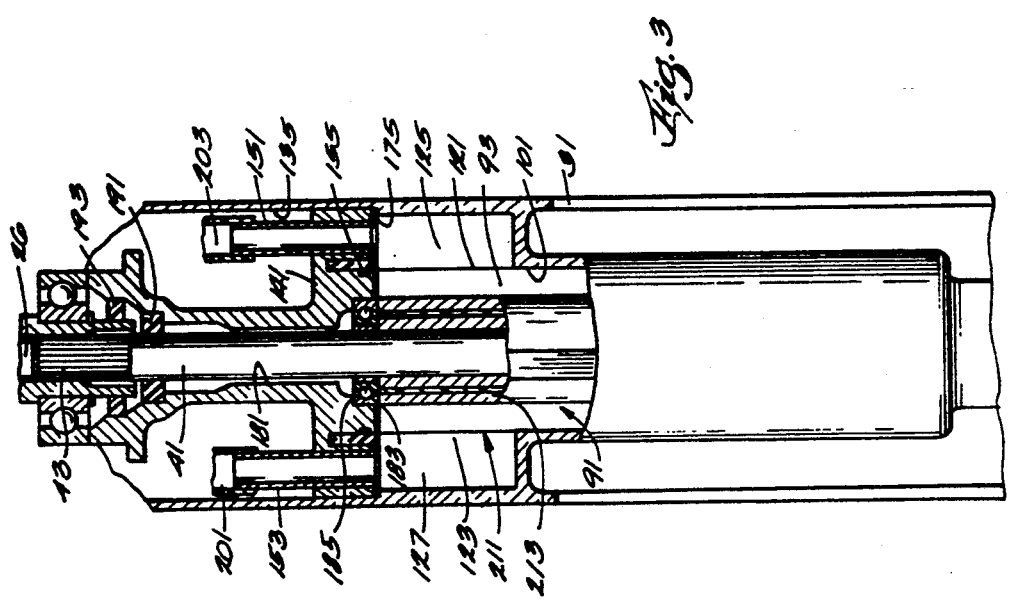
FIG. 3 is a fragmentary sectional view taken along lines 3—3 of FIG. 2.

Before one embodiment of the invention is explained in detail, it is to be understood that the invention is not limited in its application to the details of the construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DETAILED DESCRIPTION

Shown in the drawings is a marine propulsion device. In particular, the marine propulsion device shown in the drawings is in the form of an outboard motor 11 including a propulsion unit 13 and means for steerably and tiltably supporting the propulsion unit from a boat transom 15. Any suitable well known means, such as a transom bracket 17 and a swivel bracket 19 can be employed.

The propulsion unit 13 includes a power head 23 including, in a preferred embodiment in part, a two-stroke internal combustion engine 25 having a crankshaft 26, and an engine cover or shroud 27 which encloses the engine 25. The power head 23 is fixedly mounted on the top of a drive shaft housing 31 which, at its lower end, is connected to a gear case 33 which rotatably supports a propeller shaft 35 carrying a propeller 37. The propeller shaft 35 is rotatably driven through a suitable reversing transmission 39 by a drive shaft 41 which extends vertically within the drive shaft housing 31 and which, at its upper end, is drivingly connected, as through a suitable male/female splined connection 43, with the crankshaft 26 of the engine 25. The invention would work equally well with a four stroke powerhead which is also known in the art.

The engine 25 also includes one or more cylinders, two of which cylinders 51 and 53 being shown, which cylinders 51 and 53 respectively include exhaust ports 61 and 63 which communicate with an exhaust gas passageway 67 including an exhaust pipe 69 which extends into the hollow interior of the drive shaft housing 31 and includes, at the lower end thereof, an exhaust gas discharge port 71.

Located in the exhaust gas passageway 67, preferably within the power head 23, catalytic converter 81 through which the exhaust gas flows. Such catalytic converters are known and serve to reduce the principal pollutants in the exhaust gas. The three pollutants of principal concern emitted from a spark ignited internal combustion engine are unburned hydrocarbons (HC), carbon monoxide (CO), and oxides of nitrogen (NOx). The amount of HC and CO emitted can be reduced by oxidizing these constituents to form water and carbon dioxide. With a proper blend of catalytic compounds, it is possible to produce a three-way catalyst; one which will oxidize the CO and HC and which will simultaneously reduce the NOx. Preferably the catalytic converter is of the three-way type, but the invention will work with other types as well.

Downstream of the exhaust ports 61 and 63, the exhaust gas passageway 67 includes a secondary air inlet port 85 adapted for introducing secondary air into the catalytic converter 81 or into the exhaust gas passageway 67 upstream of the catalytic converter 81 so as to enable substantial elimination from the exhaust gas of pollutants.

Figure 2:
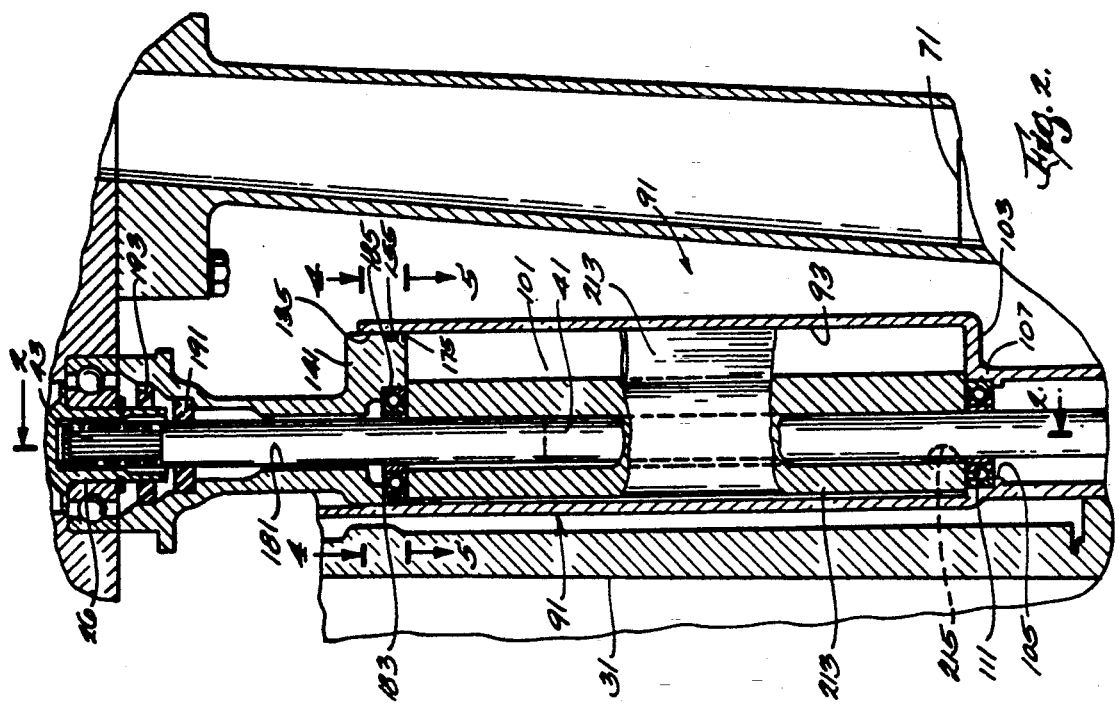
FIG. 2 is a fragmentary view, partially in section, of a portion of the outboard motor shown in FIG. 1.

The outboard motor 11 also includes means for pumping air from the atmosphere into the secondary air inlet 85 in the exhaust gas passageway 67 to facilitate elimination of the undesirable pollutants. While other arrangements can be employed, in the disclosed construction, such means comprises an air pump 91 which is driven by the drive shaft 41 and which includes (see especially FIGS. 2 and 3) a pumping chamber 93 which is integrally formed in the drive shaft housing 31 and through which the drive shaft 41 extends. Alternatively the pumping chamber 93 can be integrally formed in an inner exhaust gas housing (not shown).

More particularly, the pumping chamber 93 is cylindrical in shape, is located in eccentric relation to the drive shaft 41, and includes a generally unbroken cylindrical wall 101, together with a bottom wall 103 which extends from the cylindrical wall 101 and which is unbroken except for an opening 105 through which the drive shaft 41 extends. Surrounding the opening 105 is a counter bore 107 which receives a combination seal and bearing 111 which rotatably supports the drive shaft 41 from the drive shaft housing 31 and which prevents leakage of air from the pumping chamber 93. If desired, a separate seal member between the drive shaft 41 and the drive shaft 31 housing can be employed to prevent unwanted leakage of air from the pumping chamber 93.

At its upper end, the cylindrical wall 101 is open and includes diametrically oppositely located air inlet and outlet slots 121 and 123 which extend to the open upper end of the cylindrical wall. The slots 121 and 123 respectively communicate, through passages 125 and 127 formed radially outwardly of the pumping chamber in the drive shaft housing 31, with (see FIG. 5) a circular air inlet port area 131 and with a circular air output port area 133 which are located in a horizontal face 137 located in the drive shaft housing 31 and extending radially from the upper end of the cylindrical wall 101.

The open upper end of the cylindrical wall 101 includes a counter bore 135 which telescopically receives a closure member 141 which serves to close the upper end of the pumping chamber 93, to support an air inlet tube 151 which registers with the air inlet port area 131, to support an air outlet tube 153 which registers with the air outlet port area 133, and to rotatably support the upper portion of the drive shaft 41. Located between the cylindrical wall 101 and the closure member 141 is an annular seal member 155.

The closure member 141 is axially retained in proper location by being sandwiched between the horizontal face 137 of the drive shaft housing 31 and the lower surface of the engine 25.

In order to seal the upper ends of the air inlet and outlet slots 121 and 123, respectively, the closure member 141 includes diametrically extending wings or extensions 157 and 159 which respectively support the air inlet tube 151 and the air outlet tube 153 and which have, in the undersurfaces thereof, opposite recesses 161 and 163 which register with the slots 121 and 123, which have an axial length equal to the amount of penetration of the closure member 141 into the counterbore 135, and which respectively retain seal members 171 and 173 which extend in the slots 121 and 123 to engage the radially extending walls of the slots to insure against loss of air at the upper ends of the slots 121 and 123.

Also located between the closure member 141 and the horizontal face 137 of the drive shaft housing 31 is a gasket 175 which is unbroken except for a central opening for passage of the drive shaft 41 and openings registering respectively with the inlet port area 131 and with the outlet port area 133.

The closure member 141 also includes an offset bore 181 which receives the upper portion of the drive shaft 41. A combined seal and bearing 183 is located in a counter bore recess 185 in the bottom surface of the closure member 141, which combined seal and bearing 183 supports the drive shaft 41 from the closure member 141 (which, in turn, is supported by the drive shaft housing 31 and closes the upper end of the pumping chamber 93). At the upper end of the closure member 141, a first lip seal 191 extend between the central bore 181 and the drive shaft 41, and a second lip seal 193 extends between the central bore 181 and the crankshaft 26. Midway of the upper and lower ends thereof, the closure member 141 is necked down to provide space within the drive shaft housing 31 for the usual rubber mounts (not shown).

Extending between the air outlet tube 153 and the secondary air inlet port 85 in the exhaust gas passageway 67, is (see FIG. 1) a suitable air supply conduit or duct 201, such as a rubber hose, which preferably extends from the drive shaft housing 31 and into the power head 23 in any suitable manner. The air inlet tube 151 can also be connected to an air entry conduit or duct 203 which can extend from the drive shaft housing 31 and into the power head 23 in any suitable manner.

Interiorly of the pumping chamber 93, an air pumping impeller 211 is fixed to the drive shaft 41 for common rotation therewith. While other arrangements can be employed, in the disclosed construction, the impeller 211 includes an axially elongated vane carrier 213 which is fixed to the drive shaft 41 by a suitable key 215 and which includes diametrically oppositely located axially extending enlarged portions 217 and 219 which respectively include axially extending parallel recesses 227 and 229 located on opposite sides of the drive shaft. The recesses 227 and 229 have one end which is blind and one end which is open, with the open ends being oppositely directed. Located in the recesses 227 and 229 are respective blades or vanes 237 and 239 which, during drive shaft rotation, are urged by centrifugal force against the cylinder wall 101 of the pumping chamber 93 and which rectilinearally slide inwardly of and outwardly of the recesses 227 and 229 as the drive shaft 41 rotates. Accordingly, as a consequence of the eccentric relation of the pumping chamber 93 relative to the drive shaft 41, and rotation of the impeller 211 by the drive shaft 41, air is pumped for delivery through the air supply duct 201 into the secondary air inlet opening or port 85 in the exhaust gas passageway 67. As a consequence, the engine 25 can be run "rich" and the resulting pollutants are substantially eliminated in the catalytic converter 81 at all engine speeds.

Various of the features of the invention are set forth in the following claims:

I claim:

1. A marine propulsion device comprising a drive shaft housing including an inner wall partially defining an air pumping chamber, an impeller in said air pumping chamber, a propeller shaft rotatably supported by said drive shaft housing, an engine mounted on said drive shaft housing, and a drive shaft which is driven by said engine, which extends through said drive shaft housing, which is drivingly connected to said propeller shaft, and which extends through said air pumping chamber and is drivingly connected to said impeller.

2. A marine propulsion device as set forth in claim 1 wherein said drive shaft housing includes an air inlet port communicating between said air pumping chamber and the atmosphere, and an air outlet port communicating with said air pumping chamber.

3. A marine propulsion device as set forth in claim 2 wherein said pump chamber is cylindrical, and wherein said drive shaft is located eccentrically in said pump chamber.

4. A marine propulsion device as set forth in claim 2 and further including an exhaust passageway communicating with said engine and including a catalytic converter, and a secondary air inlet port communicating with said catalytic converter and with said air outlet port.

5. A marine propulsion device as set forth in claim 4 wherein said engine in part of a power head, and wherein said catalytic converter is located in said power head.

6. A marine propulsion device as set forth in claim 2 and further comprising a closure member which is mounted in said drive shaft housing, which rotatably supports said drive shaft, and which partially defines said pumping chamber.

7. A marine propulsion device as set forth in claim 6 wherein said closure member includes an axially extending bore through which said drive shaft passes, and further comprising sealing means located in said bore and engaging said drive shaft and said closure member for sealing said pumping chamber.

8. A marine propulsion device as set forth in claim 7 wherein said closure member has therein an annular recess which surrounds said bore and houses said sealing means.

9. A marine propulsion device as set forth in claim 7 wherein said closure member supports air inlet tube and an air outlet tube which respectively communicate with said air inlet port and said air outlet port.

10. A marine propulsion device as set forth in claim 1 and further including an exhaust passageway communicating with said engine and including a catalytic converter, and a secondary air inlet port communicating with said catalytic converter and with said air outlet port.

11. A marine outboard motor comprising a drive shaft housing including an inner wall partially defining an air pumping chamber, an air inlet port communicating between said air pumping chamber and the atmosphere, and an air outlet port communicating with said air pumping chamber, a propeller shaft rotatably supported by said drive shaft housing, an engine mounted on said drive shaft housing, a drive shaft drivingly connecting said engine to said propeller shaft and extending in said drive shaft housing and through said air pumping chamber, an exhaust passageway communicating with said engine, a catalytic converter located in said exhaust passageway and communicating with said air outlet port, and an impeller located in said air pumping chamber, mounted on said drive shaft for rotation therewith, and operative to supply air to said catalytic converter.

12. A marine outboard motor comprising a drive shaft housing including an inner wall partially defining an air pumping chamber, an air inlet port communicating between said air pumping chamber and the atmosphere, and an air outlet port communicating with said air pumping chamber, a propeller shaft rotatably supported by said drive shaft housing, an engine mounted on said drive shaft housing, a drive shaft drivingly connecting said engine to said propeller shaft and extending in said drive shaft housing and through said air pumping chamber, an impeller located in said air pumping chamber and mounted on said drive shaft for rotation therewith, and a closure member which is supported by said drive shaft housing, which partially defines said air pumping chamber, and which rotatably supports said drive shaft.

* * * * *